United States Patent
Beardsley et al.

(10) Patent No.: US 7,702,866 B2
(45) Date of Patent: Apr. 20, 2010

(54) USE OF VOLUME CONTAINERS IN REPLICATION AND PROVISIONING MANAGEMENT

(75) Inventors: Brent Cameron Beardsley, Tucson, AZ (US); Cuong Minh Le, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 685 days.

(21) Appl. No.: 11/395,630

(22) Filed: Mar. 31, 2006

(65) Prior Publication Data

US 2007/0233979 A1    Oct. 4, 2007

(51) Int. Cl.
G06F 12/00 (2006.01)

(52) U.S. Cl. ..................... 711/162; 711/170
(58) Field of Classification Search ............. 711/162, 711/170; 707/204
See application file for complete search history.

(56) References Cited

U.S. PATENT DOCUMENTS

| | | | |
|---|---|---|---|
| 6,453,383 B1 * | 9/2002 | Stoddard et al. ............ 711/112 |
| 6,629,264 B1 | 9/2003 | Sicola et al. | |
| 2001/0020254 A1 * | 9/2001 | Blumenau et al. .......... 711/163 |
| 2002/0007445 A1 * | 1/2002 | Blumenau et al. .......... 711/153 |
| 2003/0126132 A1 | 7/2003 | Kavuri et al. | |
| 2003/0149736 A1 * | 8/2003 | Berkowitz et al. ......... 711/162 |
| 2003/0233518 A1 | 12/2003 | Yamagami et al. | |
| 2004/0010580 A1 | 1/2004 | Falzon | |
| 2004/0088284 A1 | 5/2004 | Gourlay et al. | |
| 2004/0225697 A1 | 11/2004 | Asano et al. | |
| 2004/0254962 A1 | 12/2004 | Kodama et al. | |
| 2005/0021487 A1 | 1/2005 | Verma et al. | |

(Continued)

OTHER PUBLICATIONS

U.S Patent Application entitled "System and Method for Automatically Relating Components of a Storage Area Network in a Volume Container", IBM, U.S. Appl. No. 11/193,959, filed Jul. 29, 2005 by inventors P. Sarkar, J. Strickland, and B. Beardsley.

(Continued)

*Primary Examiner*—Matt Kim
*Assistant Examiner*—Michael C Krofcheck
(74) *Attorney, Agent, or Firm*—Janaki K. Davda; Konrad Raynes & Victor LLP

(57) ABSTRACT

Provided are techniques for copying data. A volume container copyset that includes volume containers is received. A volume container copyset that includes volume containers is received. Each of the volume containers is associated with a copyset role, and each of the volume containers includes zero or more volumes, wherein each of the volumes in a volume container has the copyset role of that volume container. Sets of volumes are associated with a replication session, wherein each of the sets of volumes has one volume from each of the volume containers. Each of the sets of volumes has volumes associated with a copyset role that is associated with the volume containers with which each volume is associated. In response to determining that one of membership of one of the volume containers and a size of a volume in one of the volume containers has been modified, one or more corresponding volume containers in the volume container copyset are automatically modified.

28 Claims, 11 Drawing Sheets

U.S. PATENT DOCUMENTS

| | | |
|---|---|---|
| 2005/0081006 A1 | 4/2005 | Shackelford et al. |
| 2005/0086249 A1 | 4/2005 | Keohane et al. |
| 2005/0108292 A1 | 5/2005 | Burton et al. |
| 2005/0193038 A1* | 9/2005 | Pearson et al. ............... 707/203 |
| 2006/0248273 A1* | 11/2006 | Jernigan et al. ............. 711/114 |
| 2007/0113004 A1* | 5/2007 | Sugimoto et al. ........... 711/112 |

OTHER PUBLICATIONS

International Search Report and Written Opinion dated Aug. 16, 2007 for application No. PCT/EP2007/051521 filed Feb. 16, 2007.

* cited by examiner

| Relationship Key | Subsystem1 | Subsystem2 |
|---|---|---|
|  |  |  |

USE OF VOLUME CONTAINERS IN REPLICATION AND PROVISIONING MANAGEMENT

BACKGROUND

1. Field

Embodiments of the invention relate to using volume containers in replication and provisioning management.

2. Description of the Related Art

Disaster recovery systems address two types of failures, a sudden catastrophic failure at a single point in time or data loss over a period of time. In the second type of gradual disaster, updates to volumes on data storage may be lost. Such data loss over a period of time is the common form of a site disaster because power does not degrade all at once, but, rather, may take several seconds to degrade across a computer system. While for a human this may appear instantaneous, for the computer system, the degradation of power may span several transactions, thus causing data corruption at a secondary site if care is not taken to keep the data consistent. To assist in recovery of data updates, a copy of data may be provided at a remote location. Such redundant ("dual" or "shadow") copies are typically made as the application system is writing new data to a primary control unit having storage made of primary volumes at a primary site. International Business Machines Corporation (IBM), the assignee of the subject patent application, provides several remote mirroring systems, including disaster recovery solutions, such as metro mirror (i.e., synchronous mirroring) and global mirror (i.e., asynchronous mirroring).

Merely for ease of illustration, the terms primary and secondary are used to refer to sites, control units or storage. Any site, control unit or storage (e.g., volume or cache) may be either a source or a target for purposes of data transfer or remote mirroring.

Remote mirroring systems are able to recover data updates that occur between a last, safe backup and a system failure. Such remote mirroring systems may also provide an additional remote copy for non-recovery purposes, such as local access at a remote site.

As an example, with a remote mirroring system, a primary control unit maintains a copy of data on a secondary control unit having storage made of secondary volumes. Changes to data at the primary control unit are copied to the secondary control unit as an application updates the data at the primary control unit. The changes may be made synchronously or asynchronously, depending on the type of remote mirroring system that is used.

Volumes in the primary and secondary control unit are consistent when all writes have been transferred in their logical order, i.e., all dependent writes transferred first before the writes dependent thereon. In a banking example, this may mean that a deposit is written to the secondary volume before a withdrawal. A consistency group may be described as a collection of related volumes that are kept in a consistent state. A consistency transaction set may be described as a collection of updates to the primary volumes such that dependent writes are secured in a consistent manner. Consistency groups maintain data consistency across volumes. For instance, if a failure occurs, the deposit will be written to the secondary volume before the withdrawal. Thus, when data is recovered from the secondary volumes, the recovered data will be consistent with the data at the primary control unit.

A point in time copy operation involves physically copying all the data from primary volumes to secondary volumes so that the secondary volume has a copy of the data as of a point in time. A point in time copy may also be made by logically making a copy of the data and then only copying data over when necessary, in effect deferring the physical copying. This logical copy operation is performed to minimize the time during which the secondary and primary volumes are inaccessible.

"Instant virtual copy" operations, also referred to as "fast replicate functions," work by modifying metadata, such as relationship tables or pointers, to treat a primary data object as both the original and copy. In response to a host's (i.e., a server computer's) copy request, the control unit immediately reports creation of the copy without having made any physical copy of the data. Only a "virtual" copy has been created, and the absence of an additional physical copy is completely unknown to the host.

Later, when the storage system receives updates to the original or copy, the updates are stored separately and cross-referenced to the updated data object only. At this point, the original and copy data objects begin to diverge. The initial benefit is that the instant virtual copy occurs almost instantaneously, completing much faster than a normal physical copy operation. This frees the host and control unit to perform other tasks. The host or control unit may even proceed to create an actual, physical copy of the original data object during background processing, or at another time.

One such instant virtual copy operation is known as a FlashCopy® operation. A FlashCopy® operation involves establishing a logical point in time relationship between primary and secondary volumes on the same or different devices. The FlashCopy® operation guarantees that until a track in a FlashCopy® relationship has been hardened to its location on the secondary disk, the track resides on the primary disk. A relationship table is used to maintain information on all existing FlashCopy® relationships in the control unit. During the establish phase of a FlashCopy® relationship, one entry is recorded in the primary and secondary relationship tables for the primary and secondary that participate in the FlashCopy® being established. Each added entry maintains all the required information concerning the FlashCopy® relationship. Both entries for the relationship are removed from the relationship tables when all FlashCopy® tracks from the primary extent have been physically copied to the secondary extents or when a withdraw command is received. In certain cases, even though all tracks have been copied from the primary extent to the secondary extent, the relationship persists.

Control of replication sessions, especially if one for disaster recovery is involved, is error prone and time consuming because the environment is not stable. A replication session may be described as a session type and a group of copysets. A session type defines the type of replication to be performed across the copysets, for instance to perform a FlashCopy® operation or a synchronous remote copy. A copyset is a set of volumes that hold one logical copy of the data. There is one volume per copyset role, where the copyset roles are defined by the session type. For example, in a FlashCopy® session type, the copyset roles are source and target). Session types other than a FlashCopy® session type may require more complex copysets and use different roles. For example, for a disaster recovery session type, talking about a source and target volume is problematic. If it is said that site1 is the current production site with site2 being the current backup site, the copyset includes source volumes on site1 and target volumes on site2. However, if site1 fails and recovery uses site2, then the production is run on site2. Once site1 recovers, replication is run in the opposite direction (from site2 to site1), so then the replication session runs from target to source. So for disaster recovery type sessions, instead of source and target roles, roles such as hostsite1 and hostsite2 are used to designate the volumes that a host on site 1 or a host at site 2 would mount, respectively.

The lack of stability of the environment is due, for example, to capacity being added for applications. As capacity is added for the applications, additional capacity needs to be added for the redundant copies at the secondary control unit, and this additional capacity needs to be configured into the replication session so that primary data is mirrored at the secondary data. If the additional capacity is not added and configured, then, in the event of a site disaster, not all data may have been copied to the secondary control unit.

In conventional systems it is difficult to replicate the data in the same consistency group and avoid this problem. In particular, in some conventional systems, when a user adds storage at the primary control unit, the user has to determine how much storage is to be added at the secondary control unit and where the storage may be obtained. The user also has to associate the newly added storage at the primary and secondary control units with a replication session. Such manual processing is error prone and inefficient.

Thus, there is a need in the art for improved replication management.

SUMMARY OF EMBODIMENTS OF THE INVENTION

Provided are a method, computer program product, and system for copying data. A volume container copyset that includes volume containers is received. Each of the volume containers is associated with a copyset role, and each of the volume containers includes zero or more volumes, wherein each of the volumes in a volume container has the copyset role of that volume container. Sets of volumes are associated with a replication session, wherein each of the sets of volumes has one volume from each of the volume containers. Each of the sets of volumes has volumes associated with a copyset role that is associated with the volume containers with which each volume is associated. In response to determining that one of membership of one of the volume containers and a size of a volume in one of the volume containers has been modified, one or more corresponding volume containers in the volume container copyset are automatically modified.

BRIEF DESCRIPTION OF THE DRAWINGS

Referring now to the drawings in which like reference numbers represent corresponding parts throughout:

FIG. 10 illustrates a relationship table in accordance with certain embodiments.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Merely for ease of illustration, the terms source and target may be used in examples to refer to sites, control units or storage. It is to be understood that any site, control unit or storage (e.g., volume or cache) may be either a source or a target for purposes of data transfer or remote mirroring.

Figure 1:
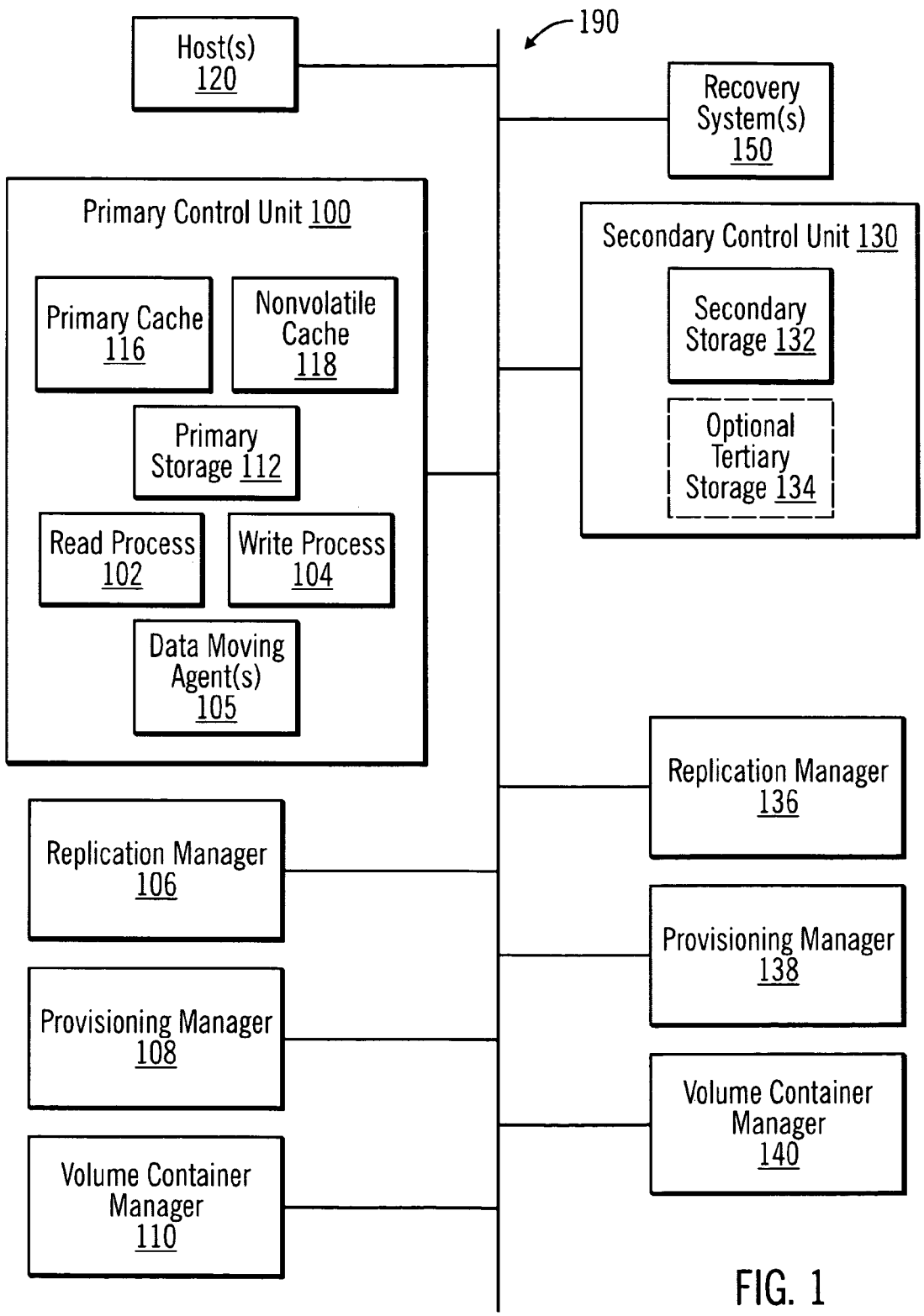
FIG. 1 illustrates details of a computing environment in accordance with certain embodiments.

FIG. 1 illustrates details of a computing environment in accordance with certain embodiments. A primary control unit 100 is coupled to one or more hosts 120 by communication paths 190 and provides the one or more hosts 120 access to primary storage 112. In certain embodiments, the hosts 120 are server computers.

The primary storage 112 may be divided into blocks of storage containing blocks of data. In certain embodiments, the blocks of data are contents of tracks, while the sub-blocks of data are contents of sectors of tracks. For ease of reference, the terms tracks and sectors may be used herein as examples of blocks of data and sub-blocks of data, but use of these terms is not meant to limit the embodiments of the invention to tracks and sectors. The embodiments of the invention are applicable to any type of storage, block of storage or block of data divided in any manner.

The primary control unit 100 includes a primary cache 116 in which updates to blocks of data in the primary storage 112 are maintained until written to primary storage 112 (i.e., the blocks of data are destaged). Additionally, the primary control unit 100 includes a nonvolatile cache 118. The non-volatile cache 118 may be, for example, a battery-backed up volatile memory, to maintain a non-volatile copy of data updates.

The primary control unit 100 includes a read process 102 for reading data, a write process 104 for writing data, and one or more data moving agents 105 for transferring data from the primary control unit 100 to the secondary control unit 130. In certain embodiments, the data moving agents 105 transfer data from the primary control unit 100 to the secondary control unit 130 asynchronously, while in other embodiments the data is transferred synchronously.

The primary control unit 100 is coupled, via communication paths 190, to a replication manager 106 for managing replication sessions, a provisioning manager 108 that provisions storage, and a volume container manager 110 that manages volume containers, which will be described in further detail below. Provisioning may be described as creating storage and making the storage accessible to the appropriate hosts 120 (e.g., identifying which hosts 120 may access that storage, determining zoning, and perform other tasks similar tasks). In certain embodiments, the volume container manager 110 may be viewed as being at a higher level of abstraction than the replication manager 106. In certain embodiments, the replication manager 106, provisioning manager 108, and volume container manager 110 are servers.

Secondary control unit 130 is coupled to one or more recovery systems 150 by communication paths 190 and provides the one or more recovery systems 150 access to secondary storage 132 and an optional tertiary storage 134, each of which maintains back-up copies of all or a subset of the volumes of the primary storage 112. In certain embodiments, the secondary control unit 130 is directly coupled to the one or more recovery systems 150, rather than being coupled via the communication paths 190. Each of secondary storage 132 and tertiary storage 134 is divided into blocks of storage containing blocks of data, and the blocks of storage are further divided into sub-blocks of storage that contain sub-blocks of data. In certain embodiments, the blocks of data are tracks, while the sub-blocks of data are sectors of tracks. For ease of reference, the terms tracks and sectors may be used herein as examples of blocks of data and sub-blocks of data, but use of these terms is not meant to limit the embodiments of the invention to tracks and sectors. The embodiments of the invention are applicable to any type of storage, block of storage or block of data divided in any manner.

The secondary control unit 130 is also coupled, via communication paths 190, to a replication manager 136 for managing replication sessions, a provisioning manager 138 that provisions storage, and a volume container manager 140 that manages volume containers. In certain embodiments, the volume container manager 140 may be viewed as being at a higher level of abstraction than the replication manager 136. In certain embodiments, the replication manager 136, provisioning manager 138, and volume container manager 140 are servers.

In certain embodiments, removable storage (instead of or in addition to remote storage, such as secondary storage 132 or tertiary storage 134) may be used to maintain back-up copies of all or a subset of the primary storage 112, and the embodiments of the invention transfer data to the removable storage rather than to the remote storage. The removable storage may be coupled to the primary control unit 100.

In certain embodiments, the primary control unit 100 and/or secondary control unit 130 may comprise any computing device known in the art, such as a mainframe, server, personal computer, workstation, laptop, handheld computer, telephony device, network appliance, virtualization device, storage controller, etc.

A primary site may include multiple primary control units, primary storage, and host computers. A secondary site may include multiple secondary control units, recovery systems, and secondary storage.

In certain embodiments, primary storage 112, secondary storage 132, and optional tertiary storage 134 may be Direct Access Storage Device (DASD).

In certain embodiments, communication paths 190 represent different communication paths of different technology. For example, some commands may use Transmission Control Protocol/Internet Protocol (TCP/IP), while other commands may use a fiber channel (e.g., Fibre Channel Protocol (FCP), an Enterprise System Connection (ESCON®) link or a Fiber Connectivity (FICON) link). Different communication paths 190 allow for redundancy to increase availability. Also, in various embodiments, each of the communication paths 190 may be shared or may not be shared. In certain embodiments, the communication paths 190 may include one or more networks, each of which may comprise any type of network, such as, for example, a Storage Area Network (SAN), a Local Area Network (LAN), Wide Area Network (WAN), the Internet, an Intranet, etc.

However, the communication paths 190 may be comprised of any other communication means known in the art, including network transmission lines, fiber optic cables, etc.

In certain embodiments, data is maintained in volume pairs. A volume pair is comprised of a volume in a primary storage device (e.g., primary storage 112) and a corresponding volume in a secondary storage device (e.g., secondary storage 132) that includes a consistent copy of the data maintained in the primary volume. For example, primary storage 112 may include Volume1 and Volume2, and secondary storage 132 may contain corresponding Volume1 and Volume2.

Initially, host 120 writes data to a track in primary cache 116. Write operations modify the track in primary cache 116, and primary cache 116 content is written to primary storage 112. Subsequently, primary cache 116 content is asynchronously written to primary storage 112. Writing data in primary cache 116 to primary storage 112 is called a destage operation. With a destage operation, the cached track is not removed from primary cache 116. When a cached track has to be removed from primary cache 116 in order to free space for other data, the cached track is said to be demoted. Copying all or a portion of a track from primary storage 112 to primary cache 116 is referred to as a staging operation.

A volume container may be described as an abstract entity that shows a relationship between hosts 120 and volumes (e.g., those in primary storage 112). The volume container automatically captures the assignment of volumes to hosts 120. The volume container further automatically captures network access control between hosts and storage control units, such as, for example, security, zoning, etc.

A volume container may be described as an object (e.g., a Java® class object) that contains a list of one or more volumes to be included in the volume container, a list of one or more hosts 120 to which the volumes attach, a reference policy to control the volumes, and one or more actions that may be taken against the volume container.

In particular, primary control unit 100 holds volumes for many different hosts 120, and not all volumes are allowed to be accessed by all hosts 120. So to attach a volume to a host 120 means that the volume is made accessible to that host 120. In certain embodiments, this means that the zones on a communication fabric are set up so that the appropriate ports on the host 120 and the primary control unit 100 are able to communicate and that the Logical Unit Number (LUN) masking on the primary control unit 100 is set up to allow the host 120 to access that volume.

The reference policy, for example, includes an allocation policy (e.g., where to obtain new storage, whether to expand volume sizes if possible or always add new volumes, performance criteria of the storage to be added, etc.) and a zoning policy that indicates what type of zoning to use when ensuring that hosts 120 and control units are able to communicate. Some of the actions that may be taken against a volume container include, for example, adding storage to the volume container, adding a volume to the volume container, adding a host to the list of hosts, removing a host from the list of hosts, removing a volume from the list of volumes, and deleting a volume from the volume container.

As for adding storage, the storage is added using the reference policy (e.g., using the allocation policy and the zoning policy). Adding storage may be said to expand the storage controlled by the volume container (e.g., a new 50 GigaByte (GB) volume may be added). Adding storage includes ensuring that the storage is assigned to the hosts in the volume container, that zoning is set up correctly, and that the one or more volumes of the added storage are available to use with, for example, host agents at a host. As for adding a volume, unlike adding storage, the volume already exists and does not need to be created.

In certain embodiments, adding a volume to a volume container assigns the volume to all of the hosts 120 in the volume container and further zones the volume to all of the hosts in the volume container. In certain embodiments, adding a host 120 to a volume container assigns the host 120 to all of the volumes in the volume container and further zones all of the hosts 120 to the volumes in the volume container.

In certain embodiments, removing a volume removes the volume from the volume container but leaves the physical volume intact. That is, removal of a volume from a volume container removes assignments of the removed volume to hosts 120 in the volume container and further removes zones associated with the removed volume. In certain embodiments, removal of a host 120 from a volume container removes assignments of the removed host 120 to volumes in the volume container and further removes zones associated with the removed host 120.

In certain embodiments, deleting a volume removes the volume from the volume container and deletes the volume from the control unit 100 (i.e., the volume no longer exists).

In certain embodiments, a host 120 may belong to multiple volume containers but a volume can belong to at most one volume container.

A copyset may be described as a group of volumes of a same type containing copies of a same volume, and, depending on session type, the volumes may also be required to be of the same size. In certain embodiments, for unidirectional sessions, the requirement is that a secondary be at least as large as a primary and, for disaster recovery types (where direction of copy may be reversed), the volumes are required to be of the same size. There is one volume per copyset role, where the copyset roles are defined by the session type.

The copysets within a replication session form a consistency group. Actions taken against the replication session are taken against all of the copysets within the replication session. The session policy determines what type of replication is to be controlled via the replication session and determines what actions and states are allowable in the replication session. Again, a copyset may be described as a set of volumes that represent copies of the same data, with the volumes in the copyset being of the same type and meeting size constraints. The number of volumes in a copyset and the copyset roles that each volume in a copyset plays in the replication session is determined by the session policy. The copyset roles include, for example: source, target, hostsite1, hostsite2, journalsite1, and journalsite2. Other copyset roles may also be used within the scope of the invention.

The volume that plays the source copyset role in the copyset is the source volume of the copyset. The volume that plays the target copyset role in the copyset is the target volume of the copyset. The volume that plays the hostsite1 (H1) copyset role in the copy set is the volume that is to be mounted and online to an application when the replication session has site1 as the production site. The volume that plays the hostsite2 (H2) copyset role in the copyset is the volume that is to be mounted and online to the application when the replication session has site 2 as the production site.

The volume that plays the journalsite1 (J1) copyset role in the copyset is the volume that is used to maintain global mirror remote mirroring system consistency when production is on site 2.

The volume that plays the journalsite2 (J2) copyset role in the copyset is the volume that is used to maintain global mirror consistency when production is on site 1.

The actions available to a replication session and the number of roles for the copysets within the replication session are determined by the session policy. The following Table A illustrates roles of volumes in a copyset based on a policy for base session types.

TABLE A

| Policy Name | Description | Roles of Volumes in Copyset |
|---|---|---|
| CC | Provide a Continuous Copy for either San Volume Controller (SVC) or Enterprise Storage System (ESS) family devices | Source, Target |
| PiT | Provide a FlashCopy ® operation with full background copy for either SVC or ESS family devices | Source, Target |
| PitNoCopy | Provide a FlashCopy ® operation with no background copy for ESS family devices | Source, Target |
| PiTInc | Provide a FlashCopy ® operation with full background copy with the persistent and incremental options set for ESS family devices | Source, Target |

With reference to a PiT policy, for a point in time session type with ESS family devices attributes, the following attributes may be changed after the replication session is created: FullCopy/NoCopy, Persistent, and Incremental.

With reference to a PitNoCopy policy, for a point in time session type with ESS family devices attributes, the following attributes may be changed after the replication session is created: FullCopy/NoCopy, Persistent, and Incremental.

With reference to a PiTInc policy, for a point in time session type with ESS family devices attributes, the following attributes may be changed after the replication session is created: FullCopy/NoCopy, Persistent, and Incremental.

The following Table B illustrates roles of volumes in a copyset based on a policy for advanced session types.

TABLE B

| Policy Name | Description | Roles of Volumes in Copyset |
|---|---|---|
| MetroMirror | Provide a two site MetroMirror disaster recovery solution | HostSite1, HostSite2 |
| TertiaryMM | Provide a two site MetroMirror disaster recovery solution with tertiary volume support at site 2 | HostSite1, HostSite2, ShadowSite2 |
| GlobalMirror | Provide a two site GlobalMirror disaster recovery solution | HostSite1, JournalSite1, HostSite2, JournalSite2 |
| TertiaryGM | Provide a two site GlobalMirror disaster recovery solution with tertiary volume support at site 2 | HostSite1, JournalSite1, HostSite2, ShadowSite2, JournalSite2 |

The operations to manage a replication session include: adding and deleting copy sets; executing allowable actions; monitoring the state and status of the replication session and initiating alerts when replication session status changes; and providing information about the state of the replication session and of the volume level relationships within the replication session.

A replication session may be described as controlling a copy operation across one or more copysets. A copy operation may be, for example, a point in time copy, a continuous copy or disaster recovery using global mirror and tertiary volumes. In certain embodiments, a volume is a basic increment to add to a replication session.

For example, for a point in time copy, a FlashCopy® operation may be performed across a set of copysets, with each copyset having a source and target volume of a same size and type. As another example, for continuous copy, a Peer-to-Peer Remote Copy (PPRC®) operation may be performed across a set of copysets, with each copyset having a source and a target volume of the same size and type. In this session type, the replication session is a consistency group (i.e., the replication session maintains consistency).

As another example, for disaster recovery using global mirror and tertiary volumes, a multi-site replication session is managed that may use either of two sites as a production site. Each site has storage, with one site replicating data of the other site. Additionally, one site has extra storage for storing a tertiary copy. For example, the tertiary copy may be used to make a practice of a disaster while the data is being copied from the other site. That is to allow normal operations on the production site to continue, including the remote replication, while a practice takeover is being run at the backup site. Each copyset of this session type has five volumes: a host volume at a first site (hostsite1), a journal volume at the first site (journalsite1) (i.e., that stores checkpoint data and enables creation of consistency groups when the secondary control unit 130 is the production site), a host volume at a second site (hostsite2), a journal volume at the second site (journalsite2), and a shadow (tertiary) volume at the second site. A disaster recovery replication session may be described as a consistency group.

Figure 2:
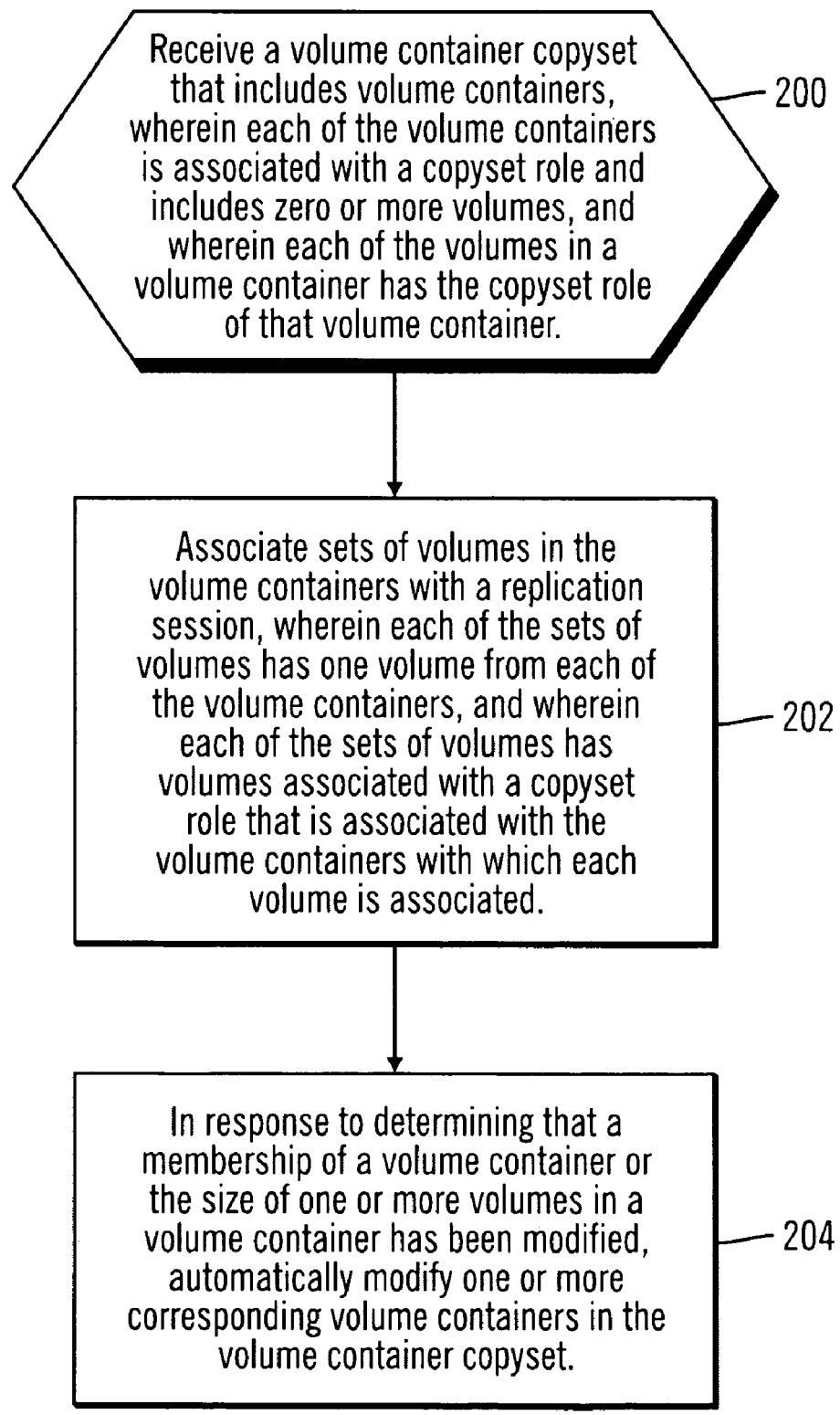
FIG. 2 illustrates logic to create and use a volume container copyset (VCcopyset) in accordance with certain embodiments.

FIG. 2 illustrates logic to create and use a volume container copyset (VCcopyset) in accordance with certain embodiments. A volume container copyset may be described as a copyset that has volume containers as elements, instead of volumes. As in the case of volume copysets, a volume container copyset has one volume container per copyset role. In certain embodiments, an existing Add Copyset command is overloaded such that the arguments are for volume container copysets (rather than volumes). Control begins at block 200 with a volume container manager 110 receiving a volume container copyset that includes volume containers, wherein each of the volume containers is associated with a copyset role and includes zero or more volumes, and wherein each of the volumes in a volume container has the copyset role of that volume container.

In block 202, the volume container manager 110 associates sets of volumes, wherein each of the sets of volumes has one volume from each of the volume containers, and wherein each of the sets of volumes has volumes associated with a copyset role that is associated with the volume containers with which each volume is associated. Each set of volumes may be described as a copyset, and volumes from a copyset all have a copyset role, which is the copyset role of the volume containers in the volume container copyset with which the volumes in the copyset are associated. In certain embodiments, the session type of the replication session is defined when the session is created. Each of the volume containers may be associated with one or more replication sessions.

In block 204, in response to determining that membership of a volume container or the size of one or more volumes in a container has been modified, the volume container manager 110, in conjunction with the provisioning manager 108 and/or the replication manager 106, automatically modifies one or more corresponding volume containers in the volume container copyset. Membership of a volume container is modified when volumes are added or deleted from a volume container, and, in such a case, corresponding volumes are added or deleted from one or more corresponding volume containers. As another example, if the size of a volume in a volume container increases, then corresponding volumes in one or more corresponding volume containers each have their size increased as well. In this manner, embodiments ensure that the volumes required by one or more applications in a replication session are available, even as additional storage is added to one of the applications.

Figure 3:
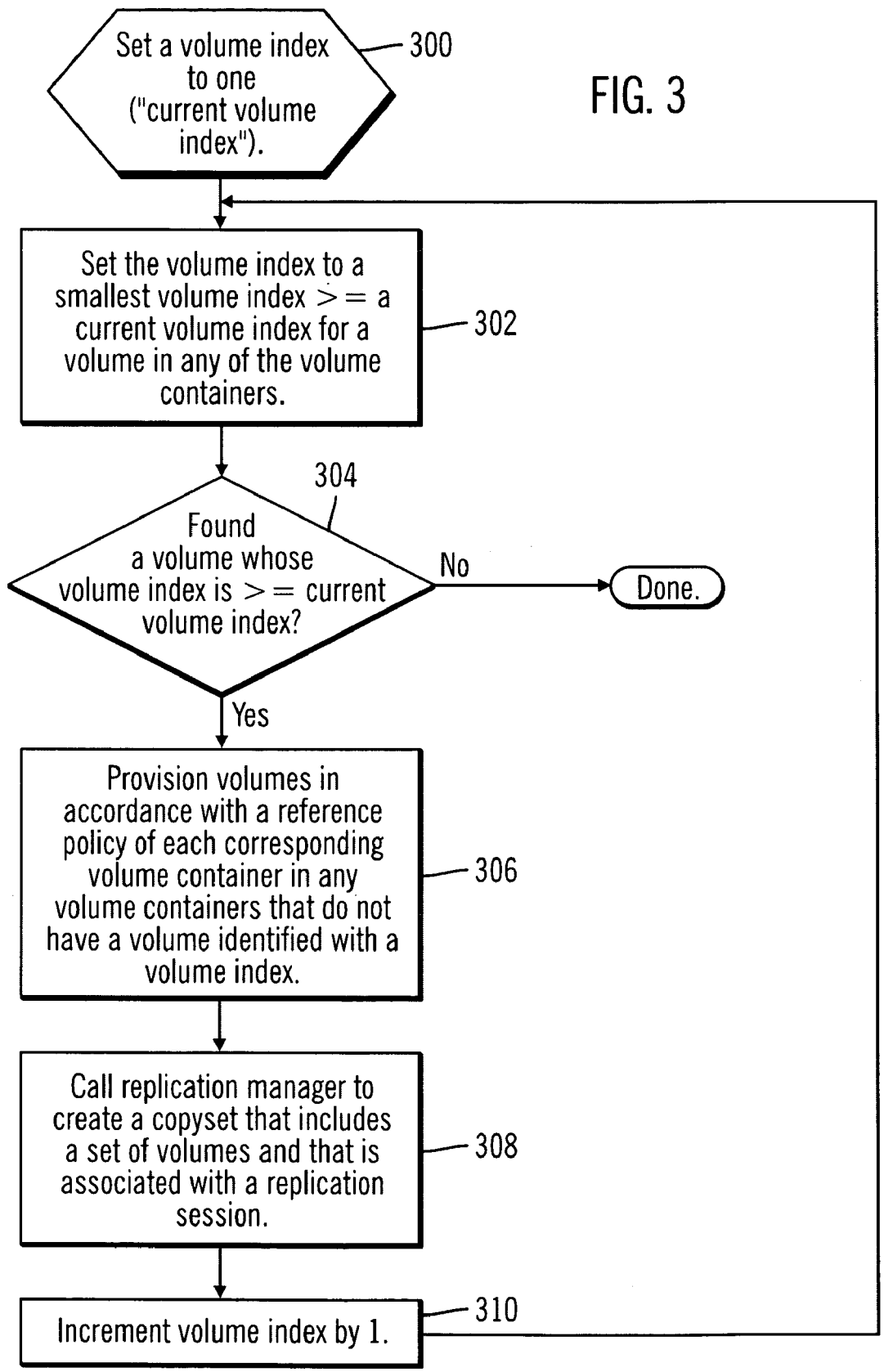
FIG. 3 illustrates logic for associating a set of volume containers with a replication session in accordance with certain embodiments.

FIG. 3 illustrates logic for associating a set of volume containers with a replication session in accordance with certain embodiments. In certain embodiments, the volumes in a volume container are ordered, which enables matching corresponding volumes to be deterministic. Control begins at block 300 with the volume container manager 110 setting a volume index to one. Initially, this volume index is a "current volume index." In block 302, the volume container manager 110 sets the volume index to a smallest volume index that is greater than or equal to (">=") a current volume index for a volume in any of the volume containers. In block 304, the volume container manager 110 determines whether a volume whose volume index is greater than or equal to a current volume index has been found. If such a volume has been found, processing continues to block 306, otherwise, processing is done. In block 306, the volume container manager 110 provisions volumes in accordance with a reference policy of each corresponding volume container in response to a call from the volume container manager 110 in any volume containers that do not have a volume identified with a volume index.

In block 308, the volume container manager 110 calls the replication manager to create a copyset that includes the set of identified volumes and to associate the copyset with a replication session. In block 310, the volume container manager 110 increments the volume index by one. From block 310, processing loops back to block 302. In this manner, all volumes in the volume containers are added to the replication session.

Figure 4:
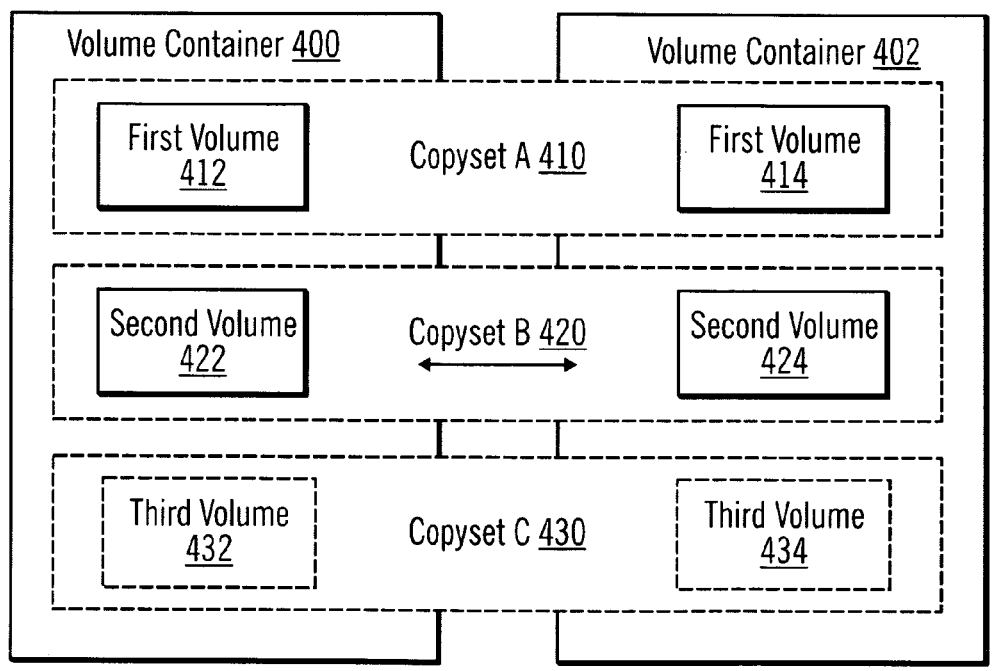
FIG. 4 illustrates a volume container copyset and copysets in accordance with certain embodiments.

FIG. 4 illustrates a volume container copyset and copysets in accordance with certain embodiments. In FIG. 4, volume container 400 and volume container 402 form a volume container copyset. A first volume 412 of the volume container 400 is matched to a first volume 414 in the volume container 402 to form Copyset A 410. A second volume 422 of the volume container 400 is matched to a second volume 424 in the volume container 424 to form Copyset B 420. A third volume 432 of the volume container 400 is matched to a third volume 434 in the volume container 402 to form Copyset C 430.

Also, when a volume container in a volume container copyset is added, deleted or has a size change, that volume container is part of one or more replication sessions. Therefore, if the reference policies of the related volume containers permit, the replication manager 106 interacts with a provisioning manager 108 to ensure that the change is reflected across the volume containers in the affected volume container copysets.

Figure 5:
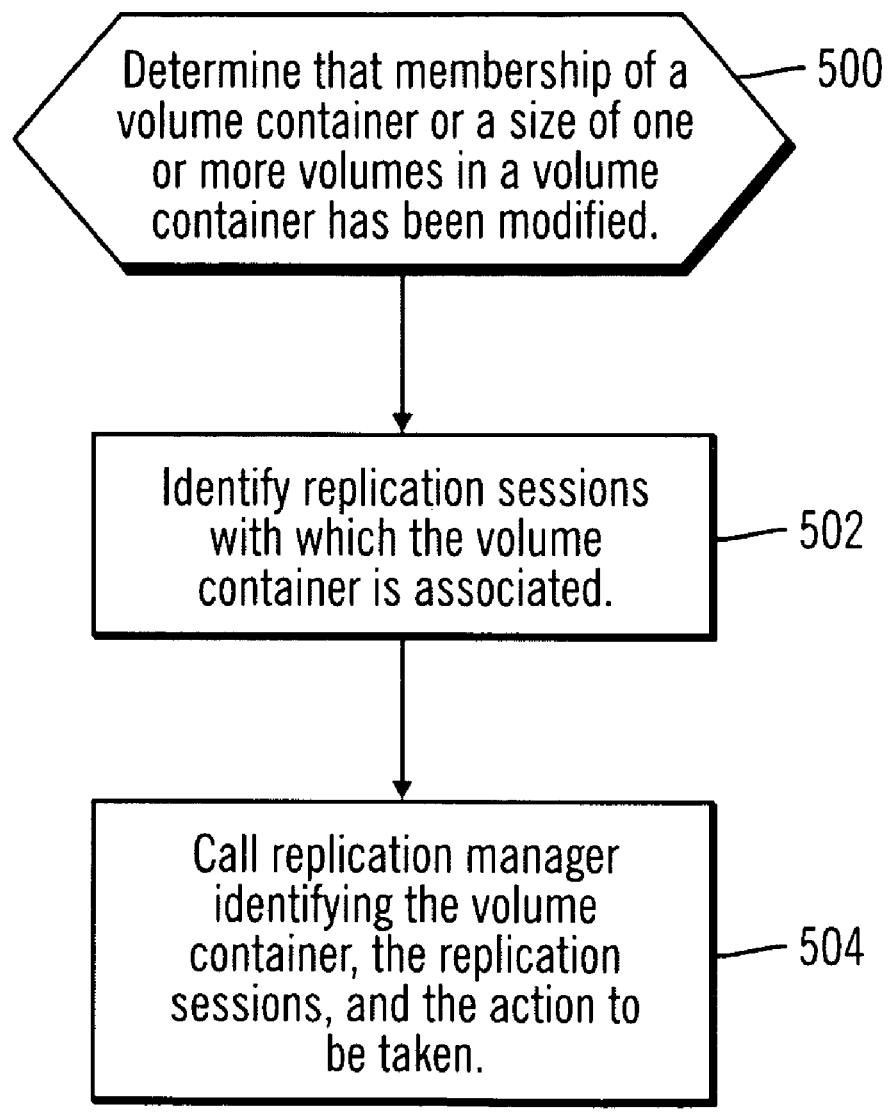
FIG. 5 illustrates logic performed when a volume container has been updated in accordance with certain embodiments.

FIG. 5 illustrates logic performed when a volume container has been updated in accordance with certain embodiments. Updating includes deleting a volume from a volume container, changing a size of a volume in a volume container, and adding a volume to a volume container. Control begins at block 500 with the volume container manager 110 determining that membership of a volume container or the size of one or more volumes in a volume container has been modified. In block 502, the volume container manager 110 identifies replication sessions with which the volume container is associated. In certain embodiments, the volume container manager 110 queries a data store to find out which volume container copysets of which replication sessions include the updated volume container as an element.

In block 504, the volume container manager 110 calls the replication manager 106 identifying the volume container that has been updated, the replication sessions that include the updated volume container as an element, and the action to be taken (e.g., delete a volume, change a volume size, or add a volume).

Figure 6:
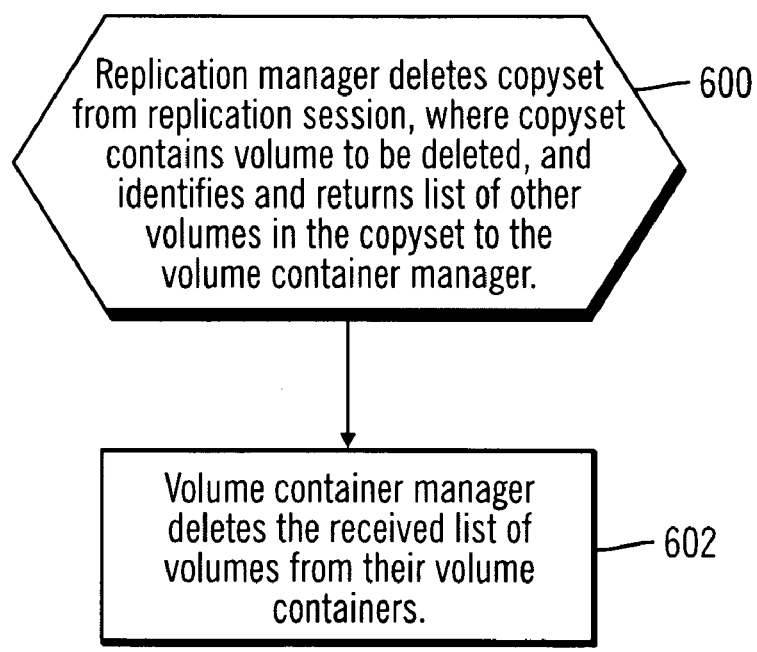
FIG. 6 illustrates logic performed when an action to be taken is to delete a volume from a volume container in accordance with certain embodiments.

FIG. 6 illustrates logic performed when an action to be taken is to delete a volume from a volume container in accordance with certain embodiments. Control begins at block 600 with the replication manager 106 deleting a copyset from the replication session, where the copyset contains the volume to be deleted, and identifying and returning a list of other volumes in the copyset to the volume container manager 110. In certain embodiments, the processing of block 600 occurs atomically. In block 602, the volume container manager 110 deletes the received list of volumes from their volume containers.

Figure 7:
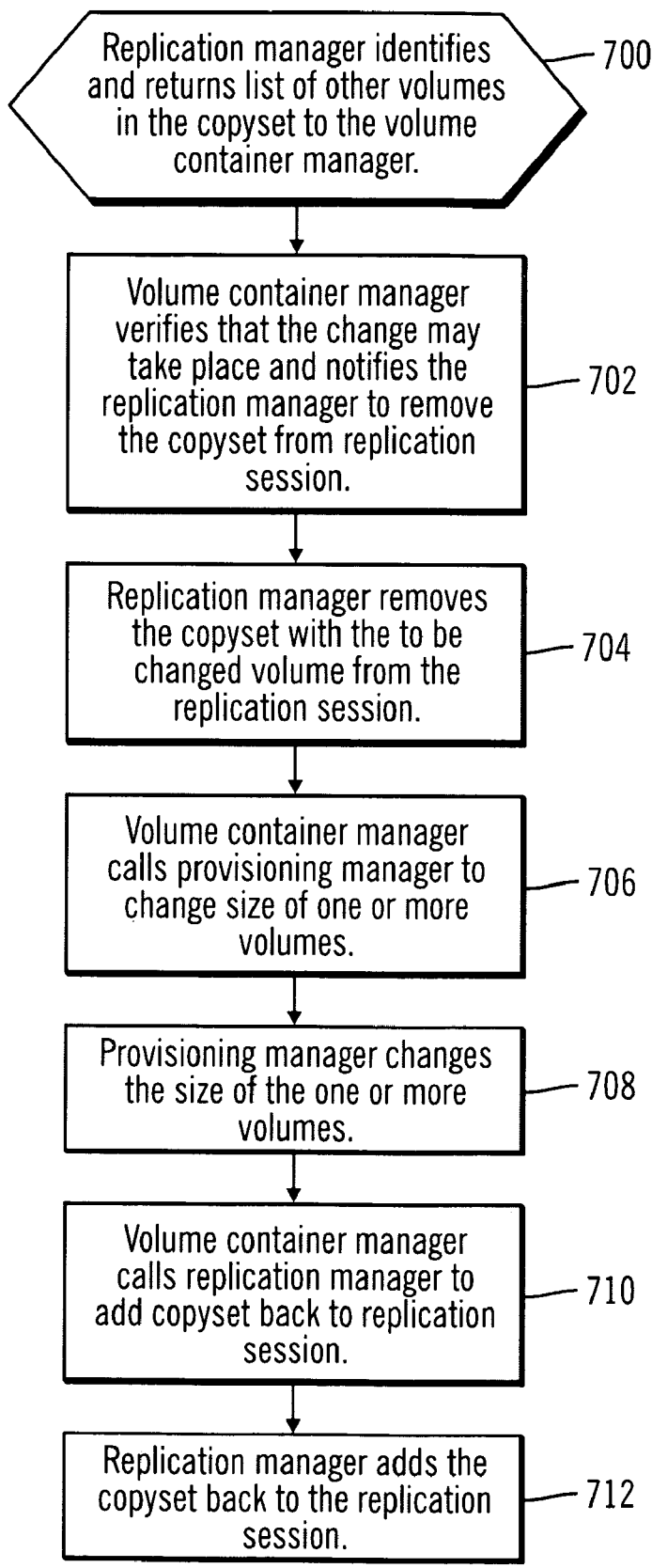
FIG. 7 illustrates logic performed when an action to be taken is to change a volume size for a volume in a volume container in accordance with certain embodiments.

FIG. 7 illustrates logic performed when an action to be taken is to change a volume size for a volume in a volume container in accordance with certain embodiments. Control begins at block 700 with the replication manager identifying and returning a list of other volumes in the copyset to the volume container manager 110, so that these other volumes may have their size changed as well. In block 702, the volume container manager 110 verifies that the change may take place and notifies the replication manager 106 to remove the copyset from the replication session. In block 704, the replication manager 106 removes the copyset with the to be changed volume from the replication session. In block 706, the volume container manager 110 calls the provisioning manager to change the size of one or more volumes. In block 708, the provisioning manager 108 changes the size of one or more volumes. In block 710, the volume container manager 110 calls the replication manager 106 to add the copyset back to the replication session. In block 712, the replication manager 106 adds the copyset back to the replication session.

Figure 8:
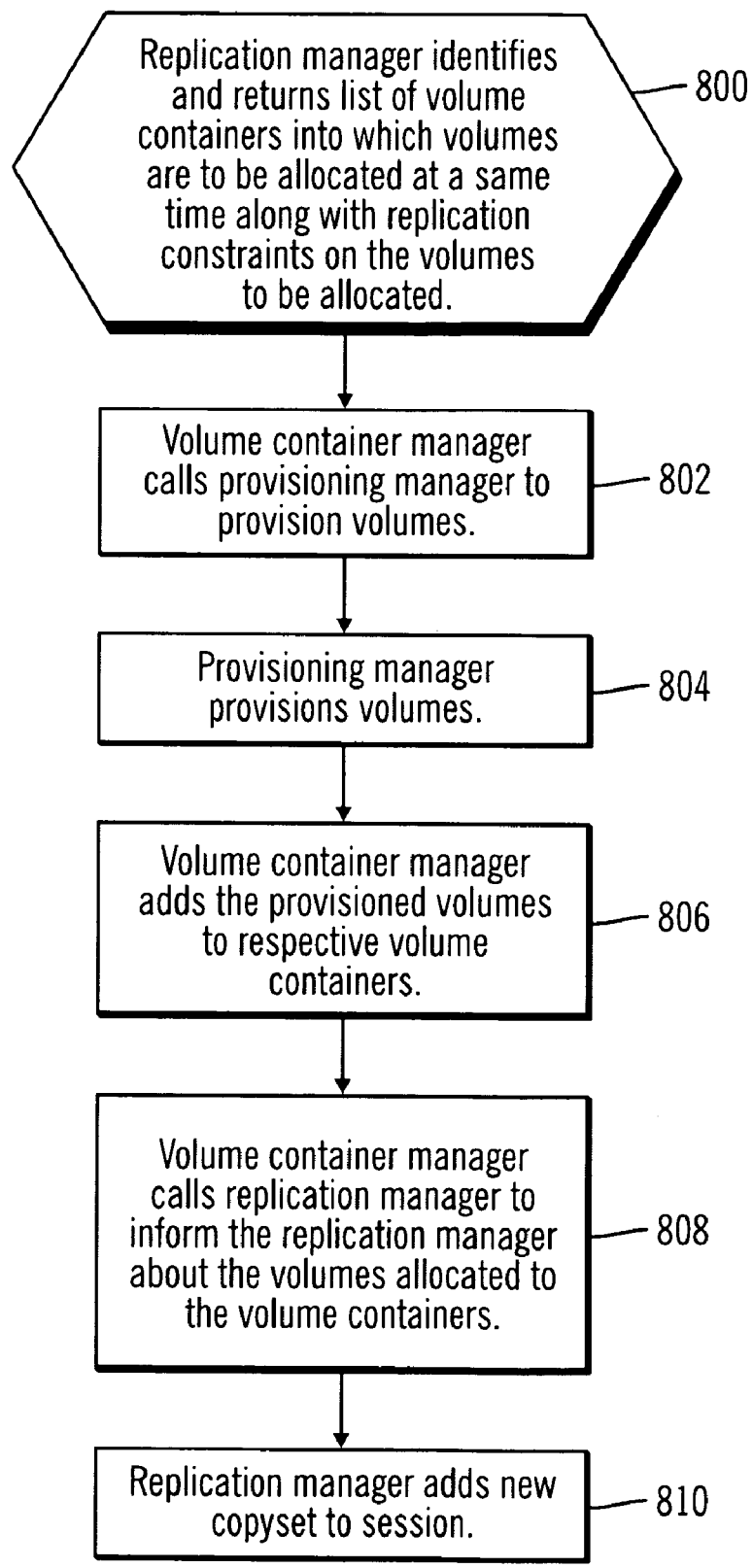
FIG. 8 illustrates logic performed when an action to be taken is to add a volume to a volume container in accordance with certain embodiments.

FIG. 8 illustrates logic performed when an action to be taken is to add a volume to a volume container in accordance with certain embodiments. Control begins at block 800 with the replication manager 106 identifying and returning a list of volume containers into which volumes are to be allocated at a same time along with replication constraints on the volumes to be allocated. In block 802, volume container manager 110 calls the provisioning manager 108 to provision volumes. In block 804, the provisioning manager 108 provisions volumes. In block 806, the volume container manager 110 adds the provisioned volumes to respective volume containers. In block 808, the volume container manager 110 calls the replication manager 106 to inform the replication manager 106 about the volumes allocated to the volume containers. In block 810, the replication manager 106 adds a new copyset to session, wherein the new copyset includes the provisioned volumes. The processing of FIG. 8 is recursive in that a recursive search is done at the beginning to identify the replication sessions and volume containers involved. Next, provisioning occurs to satisfy constraints. Then, the volume containers and copysets are updated.

Figure 9:
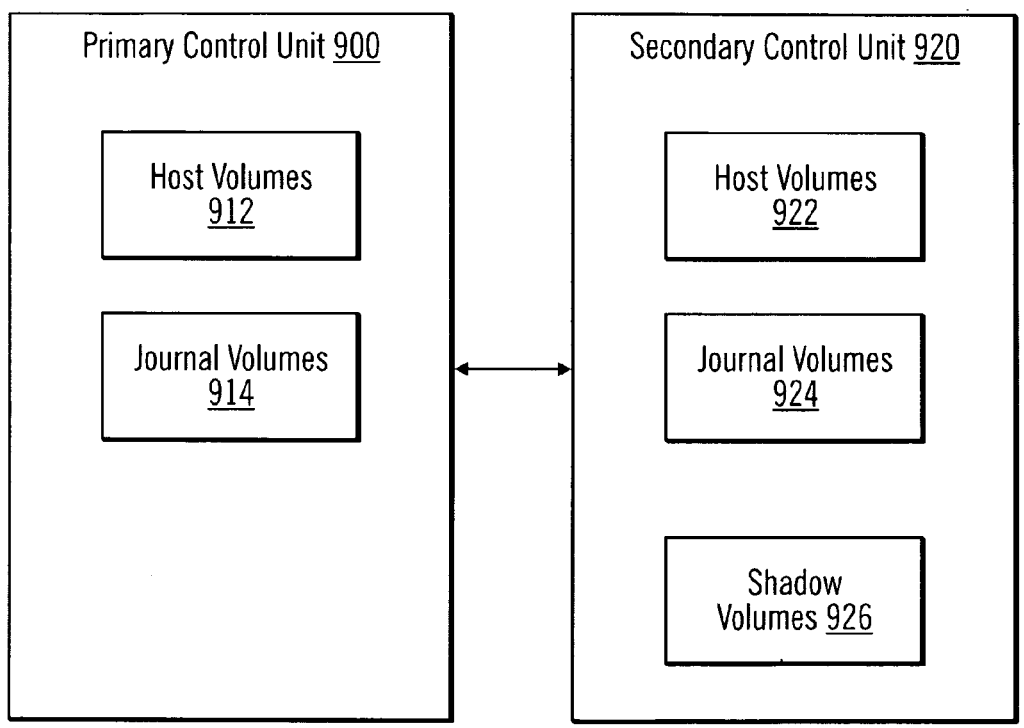
FIG. 9 illustrates an example in which a replication session type is disaster recovery using global mirror and tertiary volumes in accordance with certain embodiments.

FIG. 9 illustrates an example in which a replication session type is disaster recovery using global mirror and tertiary volumes in accordance with certain embodiments. For disaster recover using global mirror and tertiary volumes, a primary control unit 900 includes host volumes 912 and journal volumes 914, and a secondary control unit 920 includes a copy of host volumes 922, a copy of the journal volumes 924, and shadow volumes 926 (i.e., a tertiary copy of host data). In this example, the volume container manager 110 calls the replication manager 106 because a volume is added to a volume container that holds the host volumes 912. The replication manager 106 returns a requirement to allocate four additional volumes for each host volume 912 that is allocated: a journal volume 914, a host volume 922, a journal volume 924, and a shadow volume 926. The replication manager 106 also provides constraints on the volumes to be added. For example, for the journal volume 914, the additional constraint is that the volume is to be on the same control unit as the host volume 912. For the host volume 922, the additional constraint is that the volume is to be on a control unit that has PPRC® paths established with a control unit that holds the host volume 912. For the journal volume 924, the additional constraint is that the volume is to be on the same control unit as the host volume 922. For the shadow volume 926, the additional constraint is that the volume is to be on the same control unit as the host volume 922.

FIG. 10 illustrates a relationship table 1000 in accordance with certain embodiments. The replication manager 106 creates the relationship table 1000. The relationship table 1000 provides information about additional constraints on volumes to be added to volume containers. In particular, the relationship table 1000 includes a relationship field, a subsystem1 field, and a subsystem2 field. The relationship key describes what is passed in for the constraint provided by the replication manager 106, including a type of replication relationship (e.g., a remote copy that copies data between subsystems or a local copy that copies data on one subsystem). The subsystem1 field describes a subsystem of a first volume to be allocated. The subsystem2 field describes a subsystem that is allowed to be allocated given that the first volume is on subsystem1.

In certain embodiments, a subsystem may be described as a logical subsystem (LSS) (e.g., in an Enterprise Storage Server (ESS) product available from International Business Machines Corporation), while in certain other embodiments, a subsystem may be a single control unit (e.g. an IBM® DS4000 product available from International Business Machines Corporation)). In yet other embodiments, a subsystem may be described as a cluster of nodes (e.g., a San Volume Controller (SVC) product available from International Business Machines Corporation).

The subsystem relationship table 1000 is set up to enforce the constraints. In particular, each subsystem has one entry with subsystem1 and subsystem2 being the same. That is, for the relationship key for a copy operation for a same control unit, the values of subsystem1 and subsystem 2 are the same. In addition, the relationship key for a copy operation for different subsystems (e.g., a PPRC® service), there may be many relationship keys (e.g., one for a source site to a first target site, one for a source site to a second target site, one for the first target site to the second target site, one for the source site to a third target, etc.). The relationship keys in the table reflect the connectivity between the control units on the different sites.

To use the subsystem relationship table 1000, the possible control units are retrieved by querying for the relationship key and control unit1. The results of the query are used as an additional filter for the reference policy on adding new volumes for a volume container.

Thus, volumes are grouped for replication and provisioning. With embodiments, when a use updates a volume in a volume container, other volumes related by replication sessions are automatically updated.

The volume container manager and/or provisioning manager interacts with the replication manager 106 and with replication sessions to provide an extension of a Replication Manager (RM) groups and pools concept. In particular, a volume container contains the attributes of both a list of volumes (i.e., a RM group) and an allocation policy (i.e., a RM pool). However, a RM pool is a list of preallocated pool volumes, whereas the allocation policy of a volume container allows preallocated volumes and/or new volume allocations, and the volume container ensures host accessibility to the volumes. For example, a source and target volume container may be added to a point in time replication session. In this example, initially, the source volume container includes all of the source volumes, and the target volume container has no volumes. If the reference policy of the target volume container permits, adding the volume container copyset of the source and target volume containers to a replication session entails the provisioning manager 108 allocating the target volumes and putting them in the target volume container.

Thus, embodiments use a volume container to group volumes associated with application data and associated redundant volumes. Volumes are added to the volume container, rather than being added as individual volumes to a copyset. A volume container provides a way to control provisioning using a policy. Thus, as requests are made to add storage to a volume container for applications, the information that the volume container is in one or more replication sessions is used to provision redundant volumes for the added storage. Thus, the volumes in the volume containers are associated to provide appropriate redundancy.

The volume container has some application affinity, thus allowing some application to not participate in a session, while others do not. That is, other applications using their own volume containers may not participate in a session or may participate in different replication sessions.

PPRC and FlashCopy are registered trademarks or common law marks of International Business Machines Corporation in the United States and/or other countries. Java is a registered trademark or common law mark of Sun Microsystems in the United States and/or other countries.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk—read only memory (CD-ROM), compact disk—read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 2, 3, 5, 6, 7, and 8 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 2, 3, 5, 6, 7, and 8 may be implemented in software, hardware, programmable and non-programmable gate array logic or in some combination of hardware, software, or gate array logic.

Figure 11:
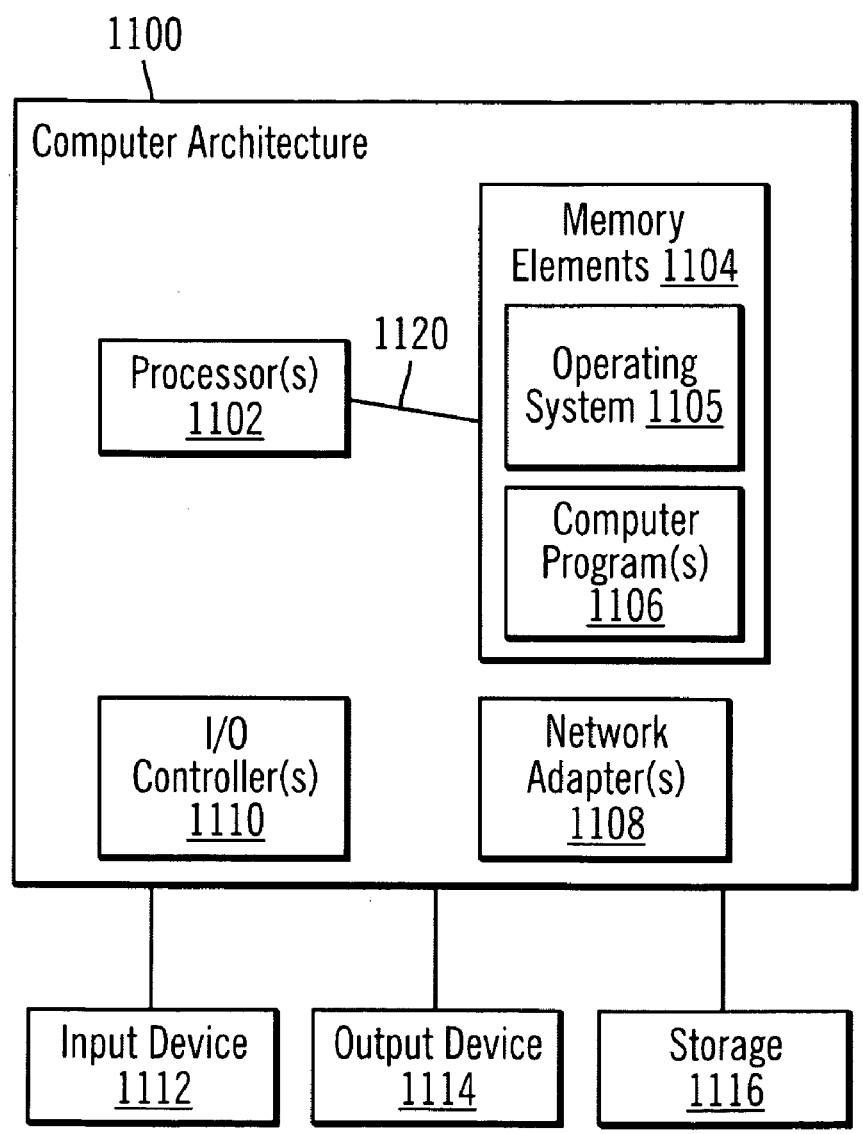
FIG. 11 illustrates an architecture of a computer system that may be used in accordance with certain embodiments.

FIG. 11 illustrates a system architecture 1100 that may be used in accordance with certain embodiments. Primary control unit 100 and/or secondary control unit 130 may implement system architecture 1100. The system architecture 1100 is suitable for storing and/or executing program code and includes at least one processor 1102 coupled directly or indirectly to memory elements 1104 through a system bus 1120. The memory elements 1104 may include local memory employed during actual execution of the program code, bulk storage, and cache memories which provide temporary storage of at least some program code in order to reduce the number of times code must be retrieved from bulk storage during execution. The memory elements 1104 include an operating system 1105 and one or more computer programs 1106.

Input/Output (I/O) devices 1112, 1114 (including but not limited to keyboards, displays, pointing devices, etc.) may be coupled to the system either directly or through intervening I/O controllers 1110.

Network adapters 1108 may also be coupled to the system to enable the data processing system to become coupled to other data processing systems or remote printers or storage devices through intervening private or public networks. Modems, cable modem and Ethernet cards are just a few of the currently available types of network adapters 1108.

The system architecture 1100 may be coupled to storage 1116 (e.g., a non-volatile storage area, such as magnetic disk drives, optical disk drives, a tape drive, etc.). The storage 1116 may comprise an internal storage device or an attached or network accessible storage. Computer programs 1106 in storage 1116 may be loaded into the memory elements 1104 and executed by a processor 1102 in a manner known in the art.

The system architecture 1100 may include fewer components than illustrated, additional components not illustrated herein, or some combination of the components illustrated and additional components. The system architecture 1100 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method for copying data, comprising:

in response to receiving a command, creating a volume container copyset that includes volume containers as elements, wherein each of the volume containers contains a list of volumes, a list of hosts to which the volumes attach, and a reference policy to control the volumes, wherein each of the volume containers is associated with a copyset role and includes the one or more volumes, and wherein each of the volumes in a volume container has the copyset role of that volume container, wherein the reference policy includes an allocation policy for allocating storage and a zoning policy that indicates what type of zoning to use;

associating sets of volumes in the volume containers with a replication session, wherein each of the sets of volumes has one volume from each of the volume containers, and wherein each of the sets of volumes has volumes associated with a copyset role that is associated with the volume containers with which each volume is associated, wherein each of the sets of volumes comprises a copyset; and in response to determining that one of, membership of and a size of a volume in, one of the volume containers has been modified, automatically modifying one or more corresponding volume containers in the volume container copyset, comprising:

identifying replication sessions with which the volume container that has been modified is associated by identifying volume container copysets of replication sessions that include the volume container as an element;

in response to a volume being deleted from a volume container, deleting volumes in one or more other volume containers corresponding to the volume container that has been modified and which are associated with the identified replication sessions;

in response to a volume being added to a volume container, adding volumes to one or more other volume containers corresponding to the volume container that has been modified and which are associated with the identified replication sessions; and in response to the size of a volume changing, changing a size of a volume in one or more other volume containers corresponding to the volume container that has been modified and which are associated with the identified replication sessions.

2. The method of claim 1, further comprising:

for each of the volume containers,
for each volume,
identifying one or more corresponding volumes in one or more corresponding volume containers; and
provisioning identified corresponding volumes that have not been provisioned.

3. The method of claim 1, wherein each of the volume containers includes one or more actions that may be taken against the volume container.

4. The method of claim 1, wherein each of the sets of volumes comprises a copyset and wherein a copyset role is selected from a group consisting of: source, target, hostsite1, hostsite2, journalsite1, and journalsite2.

5. The method of claim 1, wherein modification of membership of one of the volume containers includes at least one of deleting a volume from a volume container and adding a volume to a volume container.

6. The method of claim 5, wherein the modification comprises deleting the volume from the volume container and further comprising:

identifying a list of one or more other volumes in a copyset, wherein the copyset included the deleted volume;
removing the copyset from the replication session; and
deleting the other volumes from their volume containers.

7. The method of claim 5, wherein the modification comprises adding the volume to the volume container and further comprising identifying a list of one or more other volumes in a copyset, wherein the copyset includes the added volume;
provisioning additional volumes for the volume and the other volumes;
adding the provisioned volumes to respective volume containers; and
adding a new copyset to the replication session, wherein the new copyset includes the provisioned volumes.

8. The method of claim 7, wherein the additional volumes are provisioned based on one or more constraints defined in a subsystem relationship table and based on a reference policy of each of the respective volume containers.

9. The method of claim 1, wherein the modification comprises changing a size of the volume in the volume container and further comprising:

identifying a list of one or more other volumes in a copyset, wherein the copyset includes the changed volume;
removing the copyset from the replication session;
changing a size of the volume and the other volumes; and
adding the copyset back to the replication session.

10. A computer program product comprising a computer readable storage medium storing a computer readable program, wherein the computer readable program when executed by a processor on a computer causes the computer to:
  in response to receiving a command, creating a volume container copyset that includes volume containers as elements, wherein each of the volume containers contains a list of volumes, a list of hosts to which the volumes attach, and a reference policy to control the volumes, wherein each of the volume containers is associated with a copyset role and includes the one or more volumes, and wherein each of the volumes in a volume container has the copyset role of that volume container, wherein the reference policy includes an allocation policy for allocating storage and a zoning policy that indicates what type of zoning to use;
  associate sets of volumes in the volume containers with a replication session, wherein each of the sets of volumes has one volume from each of the volume containers, and wherein each of the sets of volumes has volumes associated with a copyset role that is associated with the volume containers with which each volume is associated, wherein each of the sets of volumes comprises a copyset; and
  in response to determining that one of, membership of and a size of a volume in, one of the volume containers has been modified, automatically modify one or more corresponding volume containers in the volume container copyset, comprising:
    identifying replication sessions with which the volume container that has been modified is associated by identifying volume container copysets of replication sessions that include the volume container as an element
    in response to a volume being deleted from a volume container, deleting volumes in one or more other volume containers corresponding to the volume container that has been modified and which are associated with the identified replication sessions;
    in response to a volume being added to a volume container, adding volumes to one or more other volume containers corresponding to the volume container that has been modified and which are associated with the identified replication sessions; and
    in response to the size of a volume changing, changing a size of a volume in one or more other volume containers corresponding to the volume container that has been modified and which are associated with the identified replication sessions.

11. The computer program product of claim 10, wherein the computer readable program when executed on a computer causes the computer to
  for each of the volume containers,
    for each volume,
      identify one or more corresponding volumes in one or more corresponding volume containers; and
      provision identified corresponding volumes that have not been provisioned.

12. The computer program product of claim 10, wherein each of the volume containers includes one or more actions that may be taken against the volume container.

13. The computer program product of claim 10, wherein each of the sets of volumes comprises a copyset and wherein a copyset role is selected from a group consisting of: source, target, hostsite1, hostsite2, journalsite1, and journalsite2.

14. The computer program product of claim 10, wherein modification of membership of one of the volume containers includes at least one of deleting a volume from a volume container and adding a volume to a volume container.

15. The computer program product of claim 14, wherein the modification comprises deleting the volume from a volume container and wherein the computer readable program when executed on a computer causes the computer to:
  identify a list of one or more other volumes in a copyset, wherein the copyset included the deleted volume;
  remove the copyset from the replication session; and
  delete the other volumes from their volume containers.

16. The computer program product of claim 14, wherein the modification comprises adding the volume to the volume container and wherein the computer readable program when executed on a computer causes the computer to:
  identify a list of one or more other volumes in a copyset, wherein the copyset includes the added volume;
  provision additional volumes for the volume and the other volumes;
  add the provisioned volumes to respective volume containers; and
  add a new copyset to the replication session, wherein the new copyset includes the provisioned volumes.

17. The computer program product of claim 16, wherein the additional volumes are provisioned based on one or more constraints defined in a subsystem relationship table and based on a reference policy of each of the respective volume containers.

18. The computer program product of claim 10, wherein the modification comprises changing a size of the volume in the volume container and wherein the computer readable program when executed on a computer causes the computer to:
  identify a list of one or more other volumes in a copyset, wherein the copyset includes the changed volume;
  remove the copyset from the replication session;
  change a size of the volume and the other volumes; and
  add the copyset back to the replication session.

19. A system for copying data, comprising:
  hardware logic capable of performing operations, the operations comprising:
    in response to receiving a command, creating a volume container copyset that includes volume containers as elements, wherein each of the volume containers contains a list of volumes, a list of hosts to which the volumes attach, and a reference policy to control the volumes, wherein each of the volume containers is associated with a copyset role and includes the one or more volumes, and wherein each of the volumes in a volume container has the copyset role of that volume container, wherein the reference policy includes an allocation policy for allocating storage and a zoning policy that indicates what type of zoning to use;
    associating sets of volumes in the volume containers with a replication session, wherein each of the sets of volumes has one volume from each of the volume containers, and wherein each of the sets of volumes has volumes associated with a copyset role that is associated with the volume containers with which each volume is associated, wherein each of the sets of volumes comprises a copyset; and in response to determining that one of, membership of and a size of a volume in, one of the volume containers has been modified, automatically modifying one or more corresponding volume containers in the volume container copyset, comprising:
identifying replication sessions with which the volume container that has been modified is associated by identifying volume container copysets of replication sessions that include the volume container as an element;
in response to a volume being deleted from a volume container, deleting volumes in one or more other volume containers corresponding to the volume container that has been modified and which are associated with the identified replication sessions;
in response to a volume being added to a volume container, adding volumes to one or more other volume containers corresponding to the volume container that has been modified and which are associated with the identified replication sessions; and
in response to the size of a volume changing, changing a size of a volume in one or more other volume containers corresponding to the volume container that has been modified and which are associated with the identified replication sessions.

20. The system of claim 19, wherein the operations further comprise:
for each of the volume containers,
for each volume,
identifying one or more corresponding volumes in one or more corresponding volume containers; and
provisioning identified corresponding volumes that have not been provisioned.

21. The system of claim 19, wherein each of the volume containers includes one or more actions that may be taken against the volume container.

22. The system of claim 19, wherein each of the sets of volumes comprises a copyset and wherein a copyset role is selected from a group consisting of: source, target, hostsite1, hostsite2, journalsite1, and journalsite2.

23. The system of claim 19, wherein modification of membership of one of the volume containers includes at least one of deleting a volume from a volume container and adding a volume to a volume container.

24. The system of claim 23, wherein the modification comprises deleting the volume from a volume container and wherein the operations further comprise:
identifying a list of one or more other volumes in a copyset, wherein the copyset included the deleted volume;
removing the copyset from the replication session; and
deleting the other volumes from their volume containers.

25. The system of claim 23, wherein the modification comprises adding the volume to the volume container and wherein the operations further comprise:
identifying a list of one or more other volumes in a copyset, wherein the copyset includes the added volume;
provisioning additional volumes for the volume and the other volumes;
adding the provisioned volumes to respective volume containers; and
adding a new copyset to the replication session, wherein the new copyset includes the provisioned volumes.

26. The system of claim 25, wherein the additional volumes are provisioned based on one or more constraints defined in a subsystem relationship table and based on a reference policy of each of the respective volume containers.

27. The system of claim 19, wherein the modification comprises changing a size of the volume in the volume container and wherein the operations further comprise:
identifying a list of one or more other volumes in a copyset, wherein the copyset includes the changed volume;
removing the copyset from the replication session;
changing a size of the volume and the other volumes; and
adding the copyset back to the replication session.

28. A method for deploying computing infrastructure, comprising integrating computer-readable code into a computing system having a processor, wherein the code in combination with the computing system is capable of performing:
in response to receiving a command, creating a volume container copyset that includes volume containers as elements wherein each of the volume containers contains a list of volumes, a list of hosts to which the volumes attach, and a reference policy to control the volumes, wherein each of the volume containers is associated with a copyset role and includes the one or more volumes, and wherein each of the volumes in a volume container has the copyset role of that volume container, wherein the reference policy includes an allocation policy for allocating storage and a zoning policy that indicates what type of zoning to use;
associating sets of volumes in the volume containers with a replication session, wherein each of the sets of volumes has one volume from each of the volume containers, and wherein each of the sets of volumes has volumes associated with a copyset role that is associated with the volume containers with which each volume is associated, wherein each of the sets of volumes comprises a copyset; and
in response to determining that one of, membership of and a size of a volume in, one of the volume containers has been modified, automatically modifying one or more corresponding volume containers in the volume container copyset, comprising:
identifying replication sessions with which the volume container that has been modified is associated by identifying volume container copysets of replication sessions that include the volume container as an element;
in response to a volume being deleted from a volume container, deleting volumes in one or more other volume containers corresponding to the volume container that has been modified and which are associated with the identified replication sessions;
in response to a volume being added to a volume container, adding volumes to one or more other volume containers corresponding to the volume container that has been modified and which are associated with the identified replication sessions; and
in response to the size of a volume changing, changing a size of a volume in one or more other volume containers corresponding to the volume container that has been modified and which are associated with the identified replication sessions.

* * * * *